CHARGE IMAGE STORAGE METHOD AND APPARATUS

Filed Dec. 7, 1966

CHARLES B. GIBSON JR.
INVENTOR

BY
BUCKHORN, BLORE, KLARQUIST & SPARKMAN
ATTORNEYS

United States Patent Office 3,426,238
Patented Feb. 4, 1969

3,426,238
CHARGE IMAGE STORAGE METHOD AND APPARATUS

Charles B. Gibson, Jr., Portland, Oreg., assignor to Tektronix, Inc., Beaverton, Oreg., a corporation of Oregon Filed Dec. 7, 1966, Ser. No. 599,933
U.S. Cl. 315—12 16 Claims
Int. Cl. H01j 29/41; G01d 15/00

ABSTRACT OF THE DISCLOSURE

The information stored on the dielectric target of a bistable storage tube is read out nondestructively employing a pulsed electron beam. The electron beam is turned on for a period having a duration less than necessary to change a given area of the target from one stable stored potential to another, while the period between pulsations is long enough so the tube's flood beam can return a given area to its original stored potential.

Figure 1:
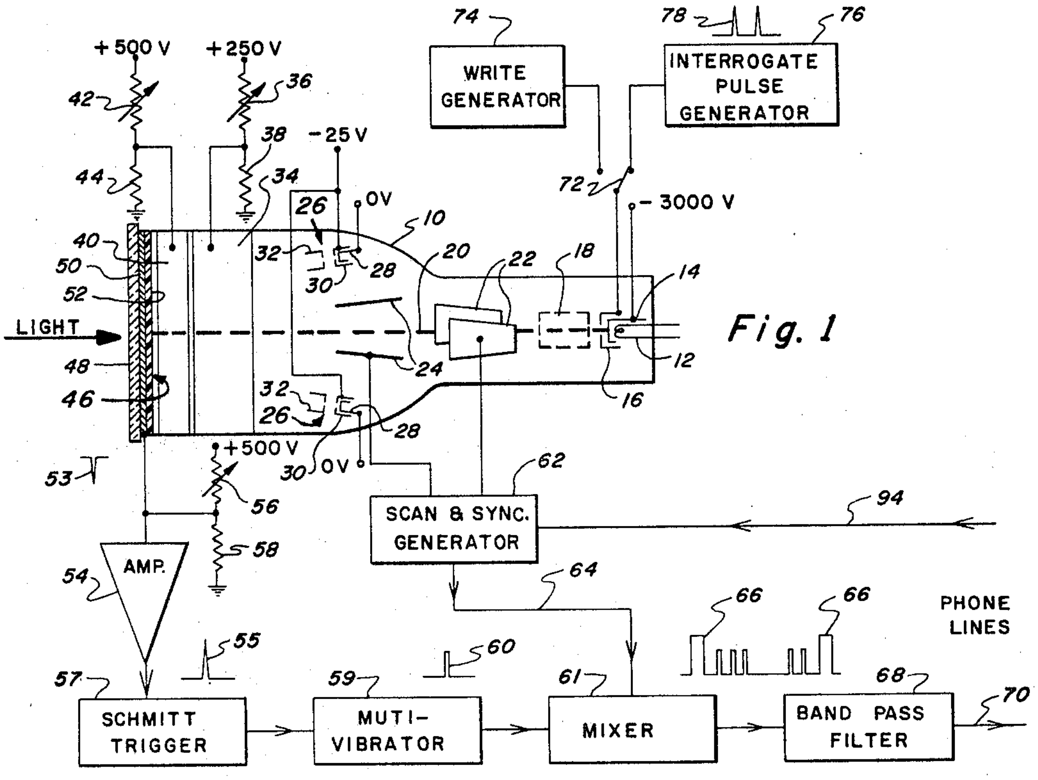

This invention relates to a charge image storage method and apparatus and particularly to such a method and apparatus providing high quality non-destructive read-out signals.

Information may be stored on the dielectric target of a cathode ray tube type device in the form of a plurality of electric charges. This information may be either digital, or pictorial as, for example, representing a curve or other visual information. Such a storage tube usually includes a high velocity electron gun for writing information on the dielectric target and one or more floods guns for retaining information on the target as a result of the secondary emission properties of the system. Information is then conventionally read out by means of a high velocity beam, either from the same gun or a gun similar to the one employed in writing the information. During read-out, charge is placed on a particular target area and causes an output signal on a signal plate associated with the target in accordance with the information previously stored. This method may destroy the information read out since information is read out in the same manner it is written.

A high velocity electron beam employed for reading information from a storage target may be deflected to scan over the surface of the storage target in a raster fashion in order to sequentially pass over the various storage locations and read out any or all of the stored information. If the beam scans rapidly and infrequently over areas of the target bearing charge information, destruction of the information stored will be avoided. However, when information is read out quite rapidly by means of a rapidly scanning electron beam, the information may encounter bandwidth problems when presented to ordinary communication circuitry for transmitting stored information from one location to another. The magnitude of the read-out current derived is also dependent upon the scanning rate. As the scanning rate and the beam current are decreased, the read-out current indicative of a particular element or area of target information is decreased. The read-out signal currents are then small and difficult to amplify, taxing the state of the art amplifier technology.

It is therefore an object of the present invention to provide an improved charge image storage method and apparatus wherein stored information is nondestructively read out.

Another object of the present invention is to provide an improved charge image storage method and apparatus wherein information may be nondestructively read out at a slow rate in order accommodate low bandwidth transmission systems and wherein the scanning beam may be stopped during its scan without destroying the information stored at that location.

It is another object of the present invention to provide an improved charge image storage apparatus employing an electron beam for slowly scanning the stored information.

It is another object of the present invention to provide an improved charge image storage method and apparatus wherein beam scanning of the stored information is not necessary.

It is another object of the present invention to provide an improved charge image storage method and apparatus for nondestructively reading stored information in a manner providing higher amplitude read-out signals suitable for application to ordinary A.C. coupled amplification apparatus.

In accordance with the method and apparatus of the present invention, the information stored on a dielectric storage tube target is read out employing a relatively high velocity pulsating electron beam for interrogation. The interrogating electron beam may be either stationary or it may be scanned as desired in order to derive information from individual locations or the entire target. The electron beam is pulsed for periods having a duration less than necessary to change a selected area of the storage tube target from one stable stored potential to another, that is, less than would be required to erase and write new information on the target. The period between pulsations is then arranged to be sufficient for the flood beam associated with the storage tube to drive the area read back to its stable potential before another beam pulsation is received.

Figure 2:
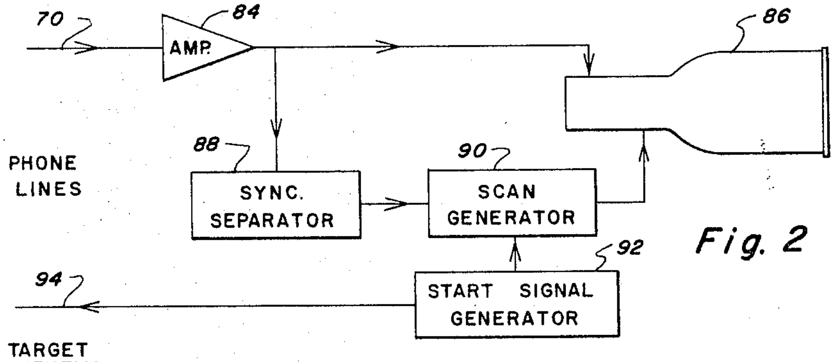
Figure 3:
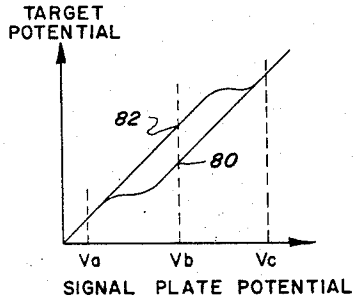
Figure 4:
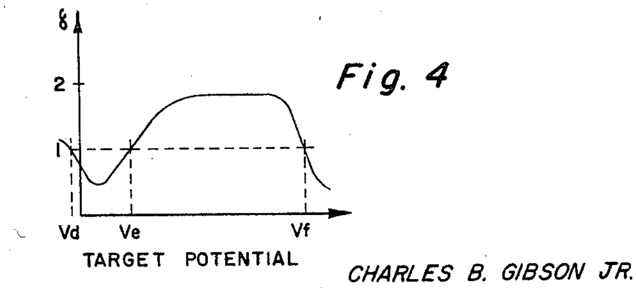

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements and in which:

FIG. 1 is a schematic diagram of a charge image storage apparatus in accordance with the present invention, FIG. 2 is a schematic diagram of charge image storage apparatus at loction remote from tht illustrated in FIG. 1 which is connected to the FIG. 1 apparatus, FIG. 3 is a plot of target potential versus signal plate potential in a charge image storage apparatus according to the present invention, and FIG. 4 is a plot of target secondary emission ratio versus target potential for a charge image storage apparatus in accordance with the present invention.

Referring to FIG. 1, a charge image storage apparatus according to the present invention includes a storage tube envelope 10 formed of insulating material housing a principal electron gun including a filament 12, a cathode 14 connected to a high negative voltage source, a control grid 16, and a focusing and accelerating structure 18. The electron beam 20 produced by the principal electron gun is deflected horizontally by means of horizontal deflection plates 22 and vertically by means of vertical deflection plates 24. The beam is directed towards a target 46 at the opposite end of the tube. The storage tube is additionally provided with one or more flood type electron guns 26 each having a cathode 28, a control grid 30, and an anode 32, and which are supported inside the envelope 10 adjacent the end of the vertical deflection plates 24 closest the target. Cathodes 28 are conveniently maintained at the zero volt level while grids 30 are suitably connected to a —25 volts. Electrons emitted from the flood guns diverge into a wide beam which is substantially uniformly distributed towards the target 46.

A plurality of electrodes are also provided on the inner surface of envelope 10 beyond the flood guns. A first electrode 34, connected to midpoint of a voltage divider comprising resistors 36 and 38 coupled between a plus 250 volts and ground, acts to provide a more uniform electric field to collimate electrons. A collector electrode 40 near the target end of the tube is connected at a midpoint of a voltage divider including resistors 42 and 44 coupled between a plus 500 volts and ground. This electrode can perform the additional function of collecting secondary electrons as will hereinafter become more evident.

Storage target 46 is disposed on the inner side of glass end plate 48 and includes a transparent signal plate 50 over which is disposed a photosensitive dielectric 52, suitably an integral layer of P–1 type phosphor. Signal plate 50 is a thin transparent conductive coating such as tin oxide or the like and is connected to the midpoint of a voltage divider comprising resistors 56 and 58 disposed between a plus 500 volts and ground. The tube voltages are selected to result in the desired secondary emission characteristic of the tube as illustrated in FIG. 4 where secondary emission ratio is plotted against target potential.

An amplifier 54, which may be of the alternating current coupled type, has its input coupled to signal plate 50. Amplifier 54 drives a Schmitt trigger circuit 57, the output of which is coupled to multivibrator 59. The Schmitt trigger circuit 57 and multivibrator 59 operate as a shaping circuit or pulse stretcher to provide an output pulse 60 of uniform length and magnitude at a time when the input voltage threshold of Schmitt trigger circuit 57 is exceeded. Output pulse 60 of multivibrator 59 is applied to mixer 61 in common with an output of scan and synchronization generator 62.

The scan and synchronization generator 62 principally provides horizontal and vertical scanning signals to horizontal and vertical plates 22 and 24 respectively of the storage tube. These scanning signals are suitably of the same general type employed in television practice and cause electron beam 20 to systematically and periodically scan target 46 in a scanning raster. The synchronizing signals corresponding to such scanning raster are applied to mixer 61 by way of lead 64. The synchronization signals 66 are indicated at the output of mixer 61, mixed with the output of multivibrator 59. The output of mixer 61 is coupled to bandpass filter 68 and from there to a telephone line 70 employed for communication with a remote location.

Control grid 16 of the principal electron gun is connected via double throw switch 72 alternatively to write generator 74 or an interrogate pulse generator 76. Write generator 74 applies the signal voltage to grid 16 for writing information charges by means of beam 20 on storage target 46 through the process of secondary emission. Write generator 74 provides its output at the same time beam 20 is directed towards or scans over a selected area or target element where information is to be written. With switch 72 thrown in the opposite position, interrogate pulse generator 76 provides a series of short duration negative voltage pulses 78 employed for reading information whereby an output is provided on signal plate 50. The pulses are such that information is neither written nor destroyed on the storage target 46, as hereinafter described. The repetition frequency of pulses 78 is adjusted to be high, for example, an order of magnitude higher than the repetition rate of information over which electron beam 20 scans during reading. This rate cannot, however, exceed the maximum bit rate of the output system unless this signal is later transformed to fall within the system's limits.

During operation, the tube polarities are arranged such that beam 20 has a relatively high velocity for writing and is capable of producing secondary electrons when it strikes storage dielectric 52. Secondary electrons are then suitably collected by collector 40 in which case the potential of collector electrode 40 is suitably adjusted to be just slightly higher than the potential of signal plate 50. The storage dielectric 52 may alternatively have a sufficiently porous structure to enable secondary electrons emitted from the bombarded surface of dielectric 52 to be transmitted therethrough and be collected.

The production of secondary electrons from an elemental area of dielectric 52 on target 46 causes such area to become relatively positive during operation of the present invention. Such area is retained at a relatively positive potential after beam 20 is scanned past such elemental area because of the action of flood guns 26. Flood guns 26 produce relatively low velocity electrons which strike the target but which ordinarily have insufficient velocity for writing information thereon. When the electrons from flood guns 26 strike areas of the target upon which a positive charge has not been written, these flood electrons tend to maintain such areas at the relatively negative potential of the flood gun, e.g., zero volts. However, the flood gun electrons are attracted by positive elemental areas and obtain a high velocity with respect to these areas producing continued secondary emission therefrom such that these areas are maintained relatively positive or near the potential of signal plate 50 and collector electrode 40. The target thus has bistable properties and is capable of retaining information written thereon, with the flood beam of electrons driving target areas towards one of two stable potentials deepnding upon the information written thereon with beam 20.

Since the phosphor storage dielectric 52 is photosensitive, a light image directed onto the storage dielectric, through end plate 48 and transparent signal plate 50, produces a charge image on the storage dielectric corresponding to such light image. The light image produces charge carriers in the dielectric such that illuminated areas of the target dielectric become more conductive and tend towards the more positive potential of signal plate 50. A light image of sufficient intensity directed towards target 46 will be maintained through the action of the flood guns in the same manner as an image written on the target by means of electron beam 20. In order to enhance the photosensitive characteristics of the phosphor storage dielectric, photoconductive material such as cadmium sulphide or zinc oxide may be uniformly mixed throughout the phosphor layer.

As previously mentioned interrogate pulse generator 76 causes a pulsation of electron beam 20 wherein the pulses are of a predetermined duration and rate such that information is read out from signal plate 50 nondestructively, i.e., such that information is not read on to the target nor taken therefrom. During operation, when the electron beam 20 strikes an area of the target where information is written in the form of a positive charge, an output pulse as indicated at 53 for example will be produced corresponding to each such pulse 78. The pulse is of relatively short duration and for this reason is applied to the pulse shaping or stretching circuitry including Schmitt trigger circuit 57 and multivibrator 59. Schmitt trigger circuit 57 produces an output when pulse 55 exceeds a predetermined voltage level and continues to produce such an output until pulse 55 drops below a second predetermined voltage level. Multivibrator 59, which is suitably a one-shot multivibrator, provides pulse 60 of uniform amplitude and duration for each such input pulse 55 applied to the Schmitt trigger circuit 57. The output pulse 60 of multivibrator 59 is long enough so that it can be received by and communicated through ordinary communication equipment. Thus, a plurality of output pulses 60, as mixed with synchronization signals 66, is suitably applied to a telephone line 70 through bandpass filter 68. Bandpass filter 68 suitably excludes 60-cycle and low frequency hum components. As will hereinafter become more evident, the scanning rate of electron beam 20 in the storage tube may be as slow as desired without resulting in problems of destructive read-out. Since slow scan rates are possible, the video information may be transmitted through communications equipment of nearly any bandwidth.

The operation of the invention will be further described with reference to FIGS. 3 and 4. A bistable storage device such as the present storage tube is in general characterized by hysteresis so that for one value of an independent variable, there are two values of a dependent variable. Such a hysteresis curve for a storage tube is illustrated in FIG. 3 where target dielectric potential is plotted against signal plate potential. The signal plate potential between the flood gun cathode 28 and signal plate 50. The potential between flood gun cathode 28 and the scanned surface of the dielectric 52 is the dependent variable. it is noted that potential between the principal electron gun cathode 14 and signal plate 50 is always high enough to insure a secondary emission ratio greater than one for electrons from the principal electron gun. Nof if the signal plate potential is first raised to $V_c$, in FIG. 3, the target potential is single valued. If the signal plate potential is then lowered smoothly to the value $V_a$, the target potential is also single valued. However, moving the signal plate potential to $V_b$, therebetween, allows the target potential to be double valued, but since the target potential was at a uniform potential when the signal plate was at $V_a$, it is now still at a uniform potential at the lower value indicated at 80. If we "write" a pattern on the target by preferentially raising selected areas to a higher potential level, e.g., by means of the principle of electron gun, we then store information and raise such areas to a potential indicated at 82, because of secondary emission produced by beam 20. Writing can also be accomplished, of course, by lowering the resistivity of a target area by photoconductivity. Now that information has been written on the target, it is maintained due to the action of the flood gun in retaining the negative polarity of unwritten areas and continuing secondary emission from positive areas.

Examining the secondary emission ratio versus target potential curve for the target acted on by the flood gun, which curve is illustrated in FIG. 4, we see three points at which the secondary emission ratio is equal to one. At $V_d$, $\delta=1$, because the target, and specifically the inside surface of dielectric 52, has collected sufficient electrons to charge a few tenths of a volt negative with respect to the flood gun cathode, thereby rejecting all electrons. At $V_e$, the accelerating potential is high enough for the material on the target dielectric surface to emit secondary electrons, and at $V_f$ the target dielectric surface has charged a few volts higher than the collector and all secondary electrons in excess of primary electrons are returned to the target. $V_d$ and $V_f$ are stable potentials. If the target begins to rise above $V_d$, the target collects electrons, the secondary emission being less than one, and the target dielectric charges negatively restoring the target dielectric to $V_d$. If we bombard the target with a high energy electron beam 20, and allow it to charge by secondary emission to any potential just under $V_e$, it will return under the action of the flood guns to $V_d$. However, if we allow it to charge more positively than $V_e$, due to the action of beam 20, the secondary emission caused by the flood electrons will charge the target dielectric positively until it reaches $V_f$. If it passes $V_f$, the secondary emission ratio becomes less than one and any electrons arriving tend to charge the target negatively. $V_e$ is described as the first crossover voltage of the secondary emission characteristic.

Now, if we wish to read out or interrogate information stored on the target, we may do so by means of the same electron beam 20 which has been employed to write information on the target, or, alternatively, we may use a separate but similar electron beam. As when writing information with such electron beam, secondary emission is produced at the target and information in the form of positive charge tends to be written. Thus information defined by the absence of a positive charge would tend to be destroyed.

In accordance with the present invention, however, short reading pulses 78 are applied to the grid 16 of the principal electron gun causing short duration pulsation of the electron beam 20. The length of each pulsation is selected such that the area to which the beam is directed is not entirely changed from one potential to another. The negative area is not rendered positive because the pulsation is shorter than required to change the selected area from $V_d$ to $V_e$ as illustrated in the FIG. 4 curve. That is, the pulsation of the electron beam 20 is short enough so that the potential of the area being read out does not exceed the first crossover point, $V_e$ of the secondary emission characteristic of the flood beam. Therefore, the flood beam drives such area back towards its original stable potential in order to retain the stored information. Mathematically $t$ is less than:

$$\frac{V_e C}{[i_p(1-\delta_1)+i_f(1-\delta_2)]} \quad (1)$$

In this expression, $i_p$=the high energy beam current, that is, the current of beam 20 during read-out;
$i_f$=the low energy flood beam current;
$\delta_1$=secondary emission ratio for $i_p$ (greater than 1);
$\delta_2$=secondary emission ratio for $i_f$ (less than1);
$V_e$=first secondary emission crossover;
C=target element capacitance at the area being read out;
$t$=time the high energy beam rests on the target element or area.

The time between pulsations of electron beam 20 is selected to be long enough for the target area read out to return to its original stable state, for example, from $V_e$ to $V_d$. In general this time, T, should be more than:

$$\frac{V_e C}{i_f(1-\delta_2)} \quad (2)$$

This is the time required for the target element to return from $V_e$ to approximately zero ($V_d$ being only slightly less than zero). However, if the pulsation time was materially less than required to take the target to the crossover point $V_e$, then the actual voltage to which the target area being read out was changed should be substituted for a $V_e$ in the above expression.

In the above expressions it will be noted that $\delta_1$, and $\delta_2$ vary during the times $t$ and T, so the inequalities (1) and (2) are usually satisfied empirically. In the case of an exemplary target employed, if a charge is delivered to the target area which is less than approximately 10 pico-couloumbs, it will be less than will write on such target. This value may be different for different targets.

The read-out obtained according to the present invention is in pulses which are uniform in amplitude, and width. The amplitude is dependent upon the current of beam 20, which is fixed, and the potential of the target. If we pulse electron beam 20 with a train of pulses with an on-time less than expression (1) and off-time greater than expression (2), this allows a stationary beam to interrogate the target area without writing or destroying information.

According to the present invention, a scan may also be applied to horizontal deflection plates 22 and vertical deflection plates 24 so that the entire target area is suitably read out. When the beam is moving, the off-time may be shortened and the on-time may be lengthened, but the foregoing inequalities (1) and (2) must still be satisfied. Since we may interrogate with a stationary beam, it is seen that the scan rate is of virtually no consequence. Therefore, extremely slow scanning may be employed, for example, when it is desired to transmit information over a transmission system having low bandwidth capabilities. The output signal is a pulse signal, and therefore, A.C. coupled amplifiers may be used throughout the system. Since the pulse output also has a characteristic period, amplifiers of the bandpass type may be used as well as bandpass filter 68 so that interfering signals such as 60-cycle hum can be conveniently excluded. The read-out signals are also of reasonable amplitude and may be conveniently amplified with ordinary amplification circuitry.

FIG. 2 illustrates a circuit for storing information at a location remote from the FIG. 1 charge image storage apparatus. Referring to FIG. 2, telephone line 70, communicating with the FIG. 1 circuit, provides an input for amplifier 84 which drives the control grid or other control electrode of a storage tube 86. Storage tube 86 is conveniently the same type of storage tube as employed in the FIG. 1 apparatus. The output of amplifier 84 is also applied to a sync separator 88 for deriving synchronization signals 66 (see FIG. 1) from the input signal. These signals synchronize scan generator 90 coupled to drive the deflection apparatus of storage tube 86 in the same scanning pattern or raster executed by the FIG. 1 apparatus.

In order to start operation of the communications system including the circuits of FIGS. 1 and 2, a start signal is initiated by means of start signal generator 92, transmitting a start pulse to scan and synchronization generator 62 in FIG. 1 via telephone line 94. The scan and synchronization generator 62 causes the electron beam 20 to execute a predetermined scan of information. At this time interrogate pulse generator 76 is coupled to control grid 16 by way of switch 72 and information is read out, the signal being derived from signal plate 50 and amplified in amplifier 54. The resultant pulse information including a plurality of pulses 60 is transmitted over telephone line 70 to storage tube 86. Pulses 60 are of sufficient duration and the constants of storage tube 86 are such that the information is written upon the target of storage tube 86.

The telephone line transmission system herein employed may be of relatively narrow bandpass characteristics, and the scanning rate employed can be quite slow to accommodate such characteristics. For example, the scanning rate may be reduced to almost zero. It is noted the amplitude of pulses 60 are standard and the mixing of synchronization signals 66 therewith is therefore simplified.

While I have shown and described a preferred embodiment of my invention, it will be apparent to those skilled in the art that many changes and modifications may be made without departing from my invention in its broader aspects. I, therefore, intend the appended claims to cover all such changes and modifications as fall within the true spirit and scope of my invention.

I claim:

1. Charge image storage apparatus comprising:

a storage target having capacitance for storing a charge pattern, first means for bombarding such storage target with a first beam of electrons capable of causing secondary emission from selected areas from said storage target upon which said beam is directed for changing the voltage at such selected areas to store information, second means for bombarding the storage target with a lower velocity flood beam of electrons acting to drive areas of said target towards one of two stable potentials depending upon information stored thereon by said first means for the purpose of holding such information on the target, means for modulating said first beam to read out stored potential information located at a selected area of said target at which the first beam is then directed including means for pulsing said first beam, wherein each pulsation thereof has a duration less than necessary to change such selected area from one said stable potential to another, the said flood beam driving such area back to its stable potential during the time between pulsations in order to retain such stable potential of such area, and means coupled to said target for detecting a read-out signal.

2. A charge image storage apparatus comprising:

a storage target for storing a charge pattern, means for bombarding said storage target with an electron beam having a velocity capable of causing secondary emission from selected areas of said storage target upon which said beam is directed to change the voltage at such selected areas for storing information, and for bombarding said storage target with a beam of electrons for reading out stored information at a selected area of said target at which such beam is then directed, including means for pulsing said beam during read-out, and means for directing a flood beam of electrons at such target for driving areas of such target towards one of two stable potentials by continued secondary emission from areas where information has been previously stored by secondary emission and by driving such target negative in areas where information has not been previously stored by secondary emission, wherein such pulsation during read-out has a duration less than necessary to change a selected area from one stable potential to another, the flood beam of electrons driving such area back towards its stable potential in order to retain such stable potential of such area.

3. The apparatus according to claim 2 wherein such pulsation is periodic and the period between successive pulsations is sufficient for said flood beam to retain the area being read out at its stored potential by driving such area entirely back to its normally stored potential whereby the sequence of pulsations does not drive such area from one stable potential to another.

4. The apparatus according to claim 2 wherein said storage target comprises a photosensitive storage dielectric such that information may be stored thereon by means of a light image.

5. The apparatus according to claim 2 wherein areas of said target where information is stored are systematically scanned during read-out with a beam of electrons.

6. The apparatus according to claim 5 including detection means coupled to said target for providing a read-out signal corresponding to said pulsations and indicative of information stored on the systematically scanned areas of said target, and including a second charge image storage apparatus comprising a storage tube disposed at a location remote from said first mentioned charge image storage apparatus, and communication means between the first mentioned charge image storage apparatus and the charge image storage apparatus at the remote location including means for synchronizing the systematic scan at both such locations, such communication means coupling the output from the detection means of the first mentioned charge image storage apparatus to the second charge image storage apparatus for storage apparatus for storage at the latter location.

7. The apparatus according to claim 2 wherein the time duration, $t$, for a pulsation is less than the product of the voltage at the first crossover point in the secondary emission characteristic of the target and the capacitance of a target area read out, said product being divided by the sum of the reading beam current multiplied by (1 minus the secondary emission ratio for the reading beam) and the flood beam current multiplied by (1 minus the secondary emission ratio for the flood beam).

8. The apparatus according to claim 7 wherein said pulsation is repetitive and the period between pulsations is greater than the product of the voltage at the first crossover point in the secondary emission characteristic for the target and the capacitance of the target area being read out, said product being divided by the flood beam current multiplied by (1 minus the secondary emission ratio for the flood beam).

9. The apparatus according to claim 7 wherein said pulsation is repetitive and the period between pulsations is greater than the product of a voltage, V, and the capacitance of the target area being read out, said product being divided by the flood beam current multiplied by (1 minus the secondary emission ratio for the flood beam), wherein the voltage, V, is the voltage actually reached by the target area being read out during the time, *t*.

10. Charge image storage apparatus comprising:

a storage target including a photosensitive storage dielectric of phosphor material, a first electron gun for bombarding said storage dielectric and writing information thereon during a writing mode with a first beam of electrons capable of causing secondary emission from selected areas of said storage target upon which said beam is directed to change the voltage at such selected areas towards a more positive value for thereby storing information, flood gun means for bombarding the storage dielectric with a flood beam of low velocity electrons to cause continued secondary emission from said storage dielectric in the region where said first beam has been directed in its writing mode while maintaining other regions negative for providing two stable delectric potentials on said target, said first electron gun including a control grid havng read-out means coupled thereto for modulating said first beam in a reading mode such that said first beam emits regular pulsations of electrons, each pulsation having a duration less than necessary to change a selected area from one stable potential to another during read-out of stored information, said flood gun producing a flood beam driving the area read back towards its stable potential, and signal plate means coupled to said target for providing a read-out signal, said charge image storage apparatus being provided with deflection means and scanning signal generator means coupled to said deflection means to cause said first electron beam from said first electron gun to systematically and periodically scan during a reading mode the areas of said target where information is stored.

11. The apparatus according to claim 10 further including amplifier means coupled to said signal plate means for receiving the read-out signal, pulse stretching means coupled to receive the output of said amplifier means for increasing the duration of pulsations received by said amplifier means indicative of information stored on said target, mixing means for mixing said stretched pulsations with synchronization information from said scanning means, a storage tube at a location remote from said charge image storage apparatus, transmission means between said mixing means and said storage tube at said remote location, scan synchronization means coupled to said transmission means at said remote location causing a systematic and periodic scan in said storage tube synchronized with the systematic and periodic scan in said charge image storage apparatus, and means applying the pulsations from said transmission means to said storage tube as a writing input thereof so that information corresponding to the bistable images in said charge image storage apparatus is written in said storage tube.

12. The apparatus according to claim 11 further including a bandpass filter in cascade with said transmission means.

13. A method of reading information from charge image storage apparatus including a dielectric storage target, a high velocity electron beam means directing a high velocity beam at said storage target, a low velocity flood gun means directed at said storage target for retaining information thereon, and means coupled to said target for providing a read-out signal, said method comprising:

directing a high velocity beam from said first electron gun at a particular area of said storage target for reading information from the same, pulsing said electron beam from said first electron gun with a pulse having a duration less than necessary to change an area being read out from one stable potential to another such stable potential, repeating such pulse with a frequency such that the period between pulses is sufficient for said flood beam to retain such area at a stored potential value by driving such area back towards its stored potential, and deriving from said means coupled to said target, read-out pulsations corresponding to pulses applied to said first electron gun and indicative of the polarity of stored information.

14. The method according to claim 13 further including scanning said electron beam in a regular pattern across the areas of said target storing information at the same time such beam is pulsed.

15. The method according to claim 13 wherein the duration of a pulse is less than the product of the voltage at the first crossover point in the secondary emission characteristic of said target and the capacitance of the area of said target being read out, said product being divided by the sum of the first beam current multiplied by: (1 minus the secondary emission ratio for the beam from the first electron gun), and the flood beam current multiplied by (1 minus the secondary emission ratio for the flood beam) and wherein the period between pulses is greater than the product of the voltage at the first crossover in the secondary emission characteristic of the target and the capacitance at the area being read out, said product being divided by the flood beam current multiplied by (1 minus secondary emission ratio for the flood beam).

16. The method of claim 15 wherein said electron beam is scanned in a regular pattern and wherein the duration of pulsation of said beam is lengthened and the period between pulses is shortened as the beam scanning rate is increased.

No references cited.

RODNEY D. BENNETT, *Primary Examiner.*

C. E. WANDS, *Assistant Examiner.*

U.S. Cl. X.R.

346—74

UNITED STATES PATENT OFFICE
CERTIFICATE OF CORRECTION

Patent No. 3,426,238 February 4, 1969

Charles B. Gibson, Jr.

It is certified that error appears in the above identified patent and that said Letters Patent are hereby corrected as shown below:

Column 1, line 34, "floods" should read -- flood --; line 71, after "order" insert -- to --. Column 2, line 45, "at loction" should read -- at a location --; same line 45, "tht" should read -- that --. Column 4, line 29, "deepnding" should read -- depending --. Column 5, line 13, after "tential" insert -- is the potential --; line 15, cancel "the", first occurrence; line 16, "that" should read -- the --; line 19, "Nof" should read -- Now --. Column 8, line 24, "emis-" should read -- emission,--. Column 9, line 28, "delectric" should read -- dielectric --.

Signed and sealed this 31st day of March 1970.

(SEAL)
Attest:

Edward M. Fletcher, Jr.
Attesting Officer

WILLIAM E. SCHUYLER, JR.
Commissioner of Patents